United States Patent
Maikawa (10) Patent No.: US 10,195,951 B2
(45) Date of Patent: Feb. 5, 2019

(54) WIRELESS POWER SUPPLY SYSTEM

(71) Applicant: NISSAN MOTOR CO., LTD., Yokohama-shi, Kanagawa (JP)

(72) Inventor: Kengo Maikawa, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 15/564,840

(22) PCT Filed: Apr. 9, 2015

(86) PCT No.: PCT/JP2015/061065
§ 371 (c)(1),
(2) Date: Oct. 6, 2017

(87) PCT Pub. No.: WO2016/162996
PCT Pub. Date: Oct. 13, 2016

(65) Prior Publication Data
US 2018/0105049 A1    Apr. 19, 2018

(51) Int. Cl.
| H01F 38/14 | (2006.01) |
| H02J 7/02 | (2016.01) |
| B60L 11/18 | (2006.01) |
| B60M 7/00 | (2006.01) |
| H02J 50/90 | (2016.01) |
| H02J 50/12 | (2016.01) |

(52) U.S. Cl.
CPC .......... *B60L 11/182* (2013.01); *B60L 11/18* (2013.01); *B60L 11/1825* (2013.01); *B60L 11/1829* (2013.01); *B60L 11/1835* (2013.01); *B60M 7/00* (2013.01); *H02J 7/025* (2013.01); *H02J 50/12* (2016.02); *H02J 50/90* (2016.02); *Y02T 10/7005* (2013.01)

(58) Field of Classification Search
CPC ............... H02J 5/005; H02J 7/025; H04B 5/0025–5/0093; H01F 38/14
See application file for complete search history.

(56) References Cited

U.S. PATENT DOCUMENTS

| 4,441,210 A * | 4/1984 | Hochmair | A61F 11/04 |
| | | | 128/903 |
| 2010/0244577 A1* | 9/2010 | Shimokawa | B60L 11/182 |
| | | | 307/104 |

(Continued)

FOREIGN PATENT DOCUMENTS

| JP | 2011-015549 A | 1/2001 |
| JP | 2013-5539 A | 1/2013 |

(Continued)

*Primary Examiner* — Rexford Barnie
*Assistant Examiner* — Terrence Willoughby
(74) *Attorney, Agent, or Firm* — Foley & Lardner LLP (57) ABSTRACT

A wireless power supply system of the present invention performs wireless power supply between a power transmission coil installed at a parking space and a power reception coil mounted on a vehicle, transmits judging power for judging a parking position from the power transmission coil to the power reception coil in an operation of parking the vehicle in the parking space, and sets an excitation frequency of the judging power to a frequency lower than an in-phase resonance point or higher than an anti-phase resonance point.

3 Claims, 9 Drawing Sheets

(56) References Cited

U.S. PATENT DOCUMENTS

2013/0057080 A1* 3/2013 Smith .................... H02J 5/005
                                                  307/104
2014/0159501 A1* 6/2014 Kanno ................... H02J 17/00
                                                  307/104
2016/0043564 A1   2/2016 Hatanaka et al.

FOREIGN PATENT DOCUMENTS

| JP | 2014-124019 A | 7/2014 |
| JP | 2014-187843 A | 10/2014 |
| WO | WO 2014/174361 A2 | 10/2014 |

* cited by examiner

FIG. 12

WIRELESS POWER SUPPLY SYSTEM

TECHNICAL FIELD

The present invention relates to a wireless power supply system that performs wireless power supply between a power transmission coil installed at a parking space and a power reception coil mounted on a vehicle.

BACKGROUND ART

Heretofore, Patent Literature 1 has been disclosed as a parking assistance system for wireless power supply. The parking assistance system disclosed in Patent Literature 1 guides a vehicle by displaying an image shot by a rear camera while the vehicle is moving backward to park. Then, when a power supply unit is hidden under the vehicle body and cannot be shot anymore, the parking assistance system supplies weak power from the power supply unit to a power reception unit, and calculates a distance between the power supply unit and the power reception unit according to a received power voltage measured at the power reception unit, thereby judging the position of the vehicle.

CITATION LIST

Patent Literature

Patent Literature 1: Japanese Patent Application Publication No. 2011-15549

SUMMARY OF INVENTION

Technical Problem

In the conventional parking assistance system described above, however, the received power voltage at the power reception unit does not increase monotonously, in some cases, even when the distance between the power reception unit and the power supply unit becomes shorter and shorter. To cope with such a case, the parking assistance system requires an additional device and needs to execute complicated control, which poses a problem that the position judgment of the vehicle cannot be made at low cost.

Therefore, the present invention has been made in view of the foregoing circumstances and has an object to provide a wireless power supply system capable of judging the position of a vehicle at a low cost without needing an additional device or execution of complicated control.

In order to solve the foregoing problems, a wireless power supply system according to one aspect of the present invention transmits judging power for judging a parking position from a power transmission coil to a power reception coil in an operation of parking a vehicle in a parking space, and sets an excitation frequency of this judging power to a frequency lower than an in-phase resonance point or higher than an anti-phase resonance point.

DESCRIPTION OF EMBODIMENTS

Hereinafter, an embodiment to which the present invention is applied will be described with reference to the accompanying drawings.

[Configuration of Wireless Power Supply System]

Figure 1:
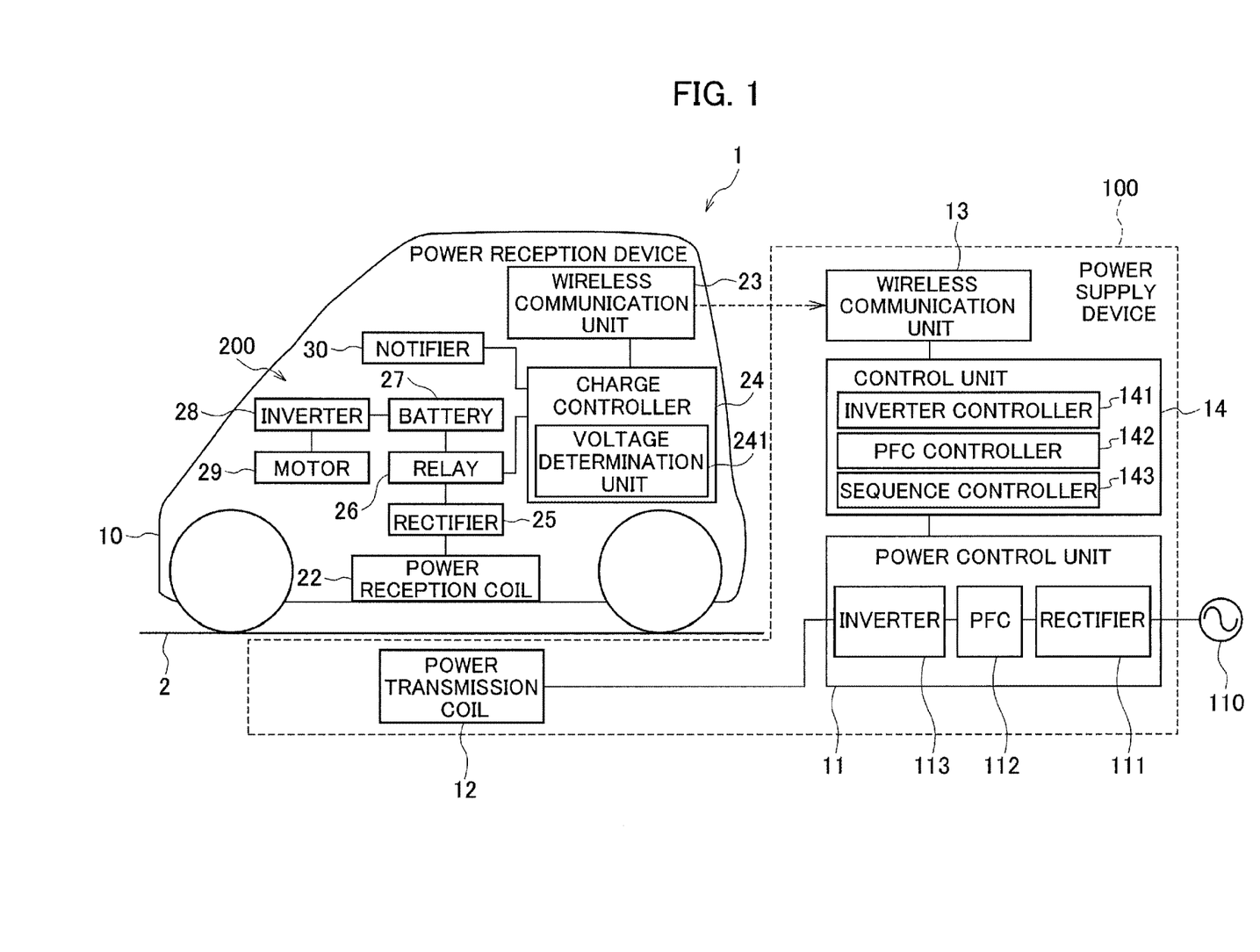
FIG. 1 is a block diagram illustrating a configuration of a wireless power supply system according to an embodiment of the present invention.

FIG. 1 is a block diagram illustrating a configuration of a wireless power supply system according to the present embodiment. As illustrated in FIG. 1, a wireless power supply system 1 according to the present embodiment includes a power supply device 100 being a ground-side unit and a power reception device 200 being a vehicle-side unit. This wireless power supply system 1 contactlessly supplies electric power from the power supply device 100 installed at a power supply stand or the like to the power reception device 200 mounted on a vehicle 10 such as an electric car or a hybrid car, and thereby charges an in-vehicle battery.

The power supply device 100 includes a power transmission coil 12 installed at a parking space 2 near the power supply stand. On the other hand, the power reception device 200 includes a power reception coil 22 installed on a bottom surface of the vehicle 10. This power reception coil 22 is arranged so as to face the power transmission coil 12 when the vehicle 10 is stopped at a predetermined position of the parking space 2.

The power transmission coil 12 is formed of a primary coil made of a conductive wire and transmits the electric power to the power reception coil 22. In addition, the power reception coil 22 is similarly formed of a secondary coil made of a conductive wire and receives the electric power from the power transmission coil 12. The wireless power supply from the power transmission coil 12 to the power reception coil 22 is achieved by an electromagnetic induction effect produced between the two coils.

The power supply device 100 on the ground side includes a power control unit 11, a power transmission coil 12, a wireless communication unit 13, and a control unit 14.

The power control unit 11 is a circuit configured to convert AC power transmitted from an AC power supply 110 to high-frequency AC power and transmit the high-frequency AC power to the power transmission coil 12. Then, the power control unit 11 includes a rectifier 111, a PFC circuit 112, and an inverter 113.

The rectifier 111 is a circuit electrically connected to the AC power supply 110, and configured to rectify the AC power outputted from the AC power supply 110. The PFC (Power Factor Correction) circuit 112 is a circuit configured to improve a power factor by regulating the waveform outputted from the rectifier 111, and is connected between the rectifier 111 and the inverter 113. The inverter 113 includes a PWM (Pulse Width Modulation) control circuit formed of a switching element such as an IGBT (Insulated Gate Bipolar Transistor), and is configured to convert DC power to AC power based on a switching control signal and supplies the AC power to the power transmission coil 12.

The wireless communication unit 13 performs bi-directional communications with a wireless communication unit 23 provided to the vehicle 10.

The control unit 14 is a section that controls the entire power supply device 100, and includes an inverter controller 141, a PFC controller 142, and a sequence controller 143. The control unit 14 executes parking position judgment processing in an operation of parking the vehicle 10 in a parking space 2. In this processing, the PFC controller 142 generates an excitation voltage command for judging power, and the inverter controller 141 generates a frequency command and a duty for the judging power, thereby controlling the inverter 113. Thus, the control unit 14 transmits the judging power for judging the parking position from the power transmission coil 12 to the power reception coil 22. The judging power will be described in details later. Meanwhile, the sequence controller 143 exchanges sequence information with the power reception device 200 via the wireless communication unit 13.

On the other hand, the power reception device 200 mounted on the vehicle 10 includes the power reception coil 22, the wireless communication unit 23, a charge controller 24, a rectifier 25, a relay 26, a battery 27, an inverter 28, a motor 29, and a notifier 30.

The power reception coil 22 is arranged at such a position that the power reception coil 22 can face the power transmission coil 12 from right above at a distance of a predetermined value away from the power transmission coil 12 when the vehicle 10 is parked at a predetermined stop position in the parking space 2.

The wireless communication unit 23 performs bidirectional communications with the wireless communication unit 13 provided to the power supply device 100.

The charge controller 24 is a controller to control the charging of the battery 27, and includes a voltage determination unit 241. In the operation of parking the vehicle 10 in the parking space 2, in particular, the charge controller 24 executes the parking position judgment processing. In this processing, the voltage determination unit 241 monitors a power reception state of the judging power at the power reception coil 22. The parking position judgment processing will be described in details later. The charge controller 24 controls the wireless communication unit 23, the notifier 30, the relay 26, and so on, and transmits a signal indicating the start of charging to the control unit 14 of the power supply device 100 via the wireless communication unit 23.

The rectifier 25 is formed of a rectifier circuit connected to the power reception coil 22 and configured to rectify the AC power received at the power reception coil 22 to a DC current.

The relay 26 includes a relay switch that is switchable between on and off according to control of the charge controller 24. In addition, by turning the relay switch off, the relay 26 disconnects a main circuit system including the battery 27 from the power reception coil 22 and the rectifier 25 constituting a charge circuit section.

The battery 27 includes multiple secondary batteries connected to each other, and serves as a power source of the vehicle 10.

The inverter 28 includes a PWM control circuit formed of a switching element such as an IGBT, and converts the DC power outputted from the battery 27 into AC power based on a switching control signal to supply the AC power to the motor 29.

The motor 29 is formed of, for example, a three-phase AC motor, and serves as a driving source for driving the vehicle 10.

The notifier 30 is formed of an alarm lamp, a display of a navigation system, a speaker, or the like, and outputs light, an image, sound, or the like to a user based on the control of the charge controller 24.

With the configuration described above, the wireless power supply system 1 enables contactless transmission and reception of high-frequency electric power by means of an electromagnetic induction effect produced between the power transmission coil 12 and the power reception coil 22. Specifically, when a voltage is applied to the power transmission coil 12, a magnetic coupling occurs between the power transmission coil 12 and the power reception coil 22, and the electric power is supplied from the power transmission coil 12 to the power reception coil 22.

[Method of Setting Excitation Frequency of Judging Power]

The wireless power supply system 1 according to the present embodiment executes the parking position judgment processing for judging the parking position in the operation of parking the vehicle 10 in the parking space 2. In this parking position judgment processing, the judging power for judging the parking position of the vehicle 10 is transmitted from the power transmission coil 12 to the power reception coil 22, and the received power voltage at the power reception coil 22 is monitored to judge the parking position of the vehicle 10. The judging power transmitted in this parking position judgment processing is electric power transmitted under settings such that the electric power is weaker than usual charging power and that an excitation voltage and an excitation frequency of the power transmission coil 12 are fixed.

Here, the received power voltage of the power reception coil 22 is set to monotonously increase as the distance between the power transmission coil 12 and the power reception coil 22 becomes shorter. Thus, when the received power voltage exceeds a predetermined threshold, the power transmission coil 12 and the power reception coil 22 can be regarded as being sufficiently close to each other.

It should be noted that the excitation frequency of the judging power needs to be set lower than an in-phase resonance point or higher than an anti-phase resonance point in order to set the received power voltage at the power reception coil 22 to monotonously increase according to a distance between the power transmission coil 12 and the power reception coil 22. Hereinafter, detailed description will be provided for a method of setting the excitation frequency of the judging power.

Figure 2:
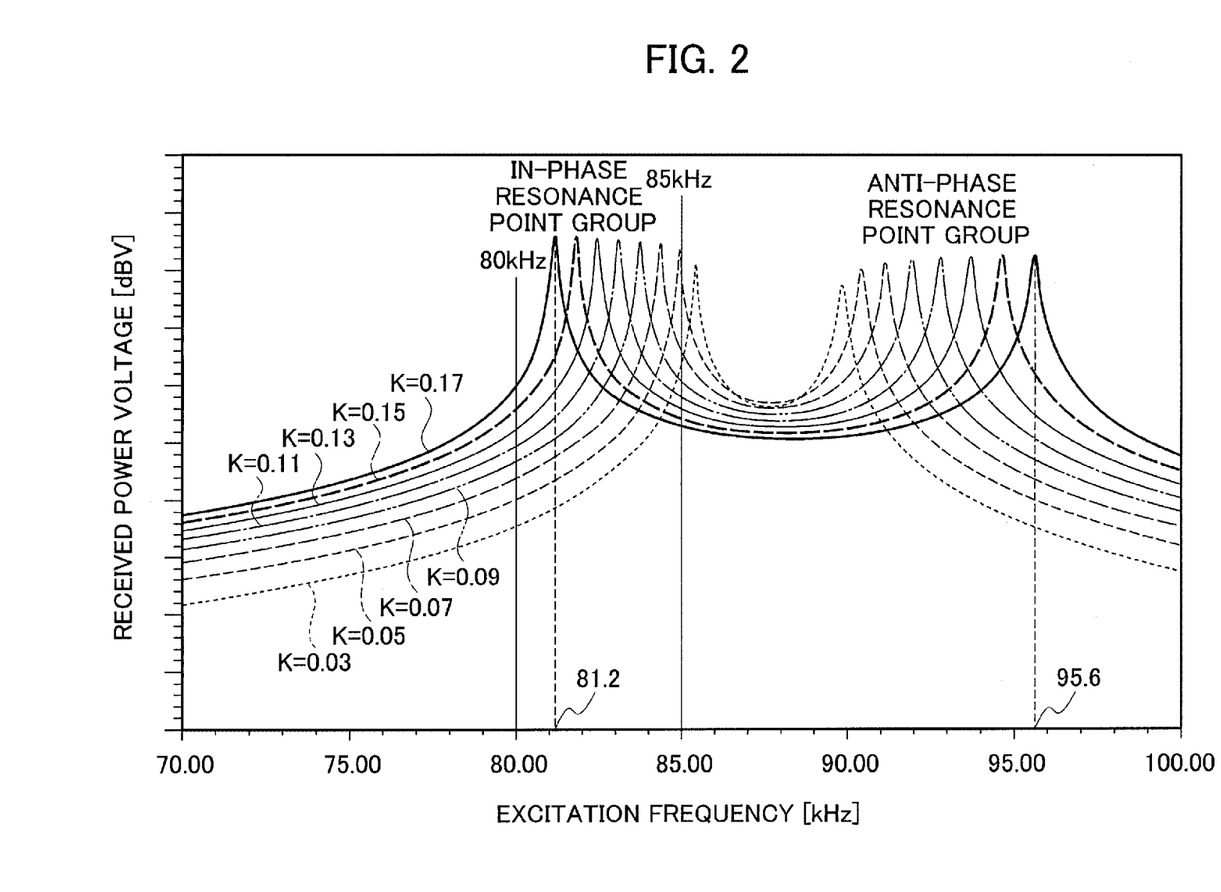
FIG. 2 is a diagram presenting frequency characteristics of a received power voltage of a power reception coil in the wireless power supply system according to the embodiment of the present invention.

First of all, with reference to FIG. 2, description will be provided for frequency characteristics of the received power voltage of the judging power received at the power reception coil 22 when the judging power is transmitted from the power transmission coil 12 to the power reception coil 22. FIG. 2 presents a relationship between the received power voltage of the power reception coil 22 and the excitation frequency of the judging power. The frequency characteristics of the received power voltage of the power reception coil 22 are represented by multiple curved lines depending on coupling coefficients K as presented in FIG. 2, and are represented by 8 curved lines for K=0.03 to 0.17 in FIG. 2. These curved lines are in a shape having two peaks of an in-phase resonance point group including in-phase resonance points gathered together and an anti-phase resonance point group including anti-phase resonance points gathered together.

Figure 3:
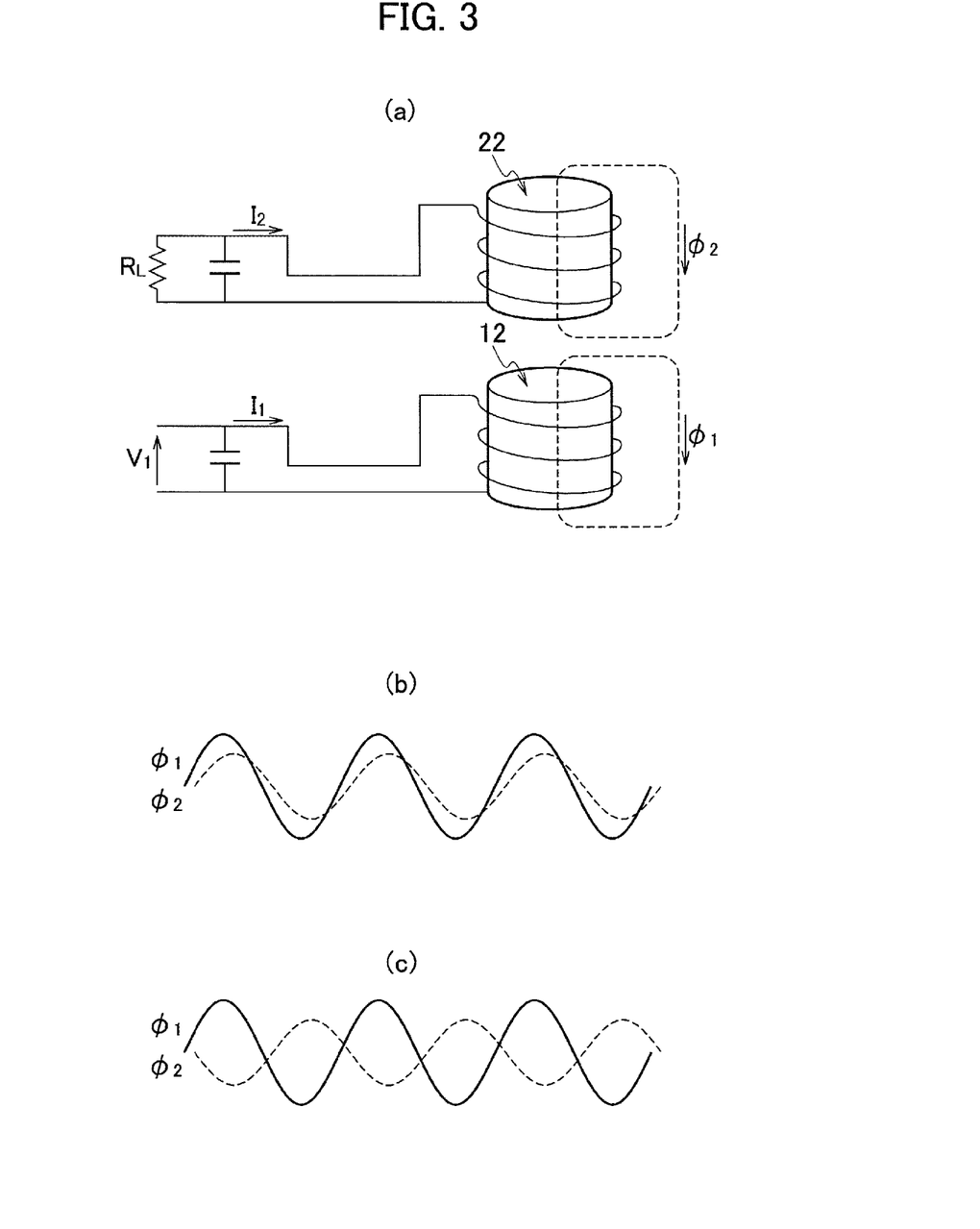
FIG. 3 is diagrams for explaining an in-phase resonance point and an anti-phase resonance point in the wireless power supply system according to the embodiment of the present invention.

Here, description will be provided for the principle based on which the in-phase resonance point and the anti-phase resonance point occur in the frequency characteristics of the received power voltage of the power reception coil 22. FIG. 3(a) is a circuit schematic diagram of circular-type coils, and illustrates the power transmission coil 12 and its resonance circuit as well as a power reception coil 22 and its resonance circuit. A load is denoted by $R_L$, and coil currents of the power transmission coil 12 and the power reception coil 22 are denoted by I1 and I2, respectively, and are defined as flowing in illustrated directions. When a current I1 flows in the power transmission coil 12, a magnetic flux $\Phi1$ is generated at the power transmission coil 12 according to Ampere's right hand screw rule. Similarly, when a current I2 flows in the power reception coil 22, a magnetic flux $\Phi2$ is generated at the power reception coil 22.

In the present embodiment, an in-phase mode is defined as a range in which a phase difference θ between $\Phi1$ and $\Phi2$ is from −90 degrees to 90 degrees, and an anti-phase mode is defined as a range in which a phase difference θ between $\Phi1$ and $\Phi2$ is from −180 degrees to −90 degrees or from 90 degrees to 180 degrees. In the in-phase mode, both the magnetic fluxes $\Phi1$ and $\Phi2$ strengthen each other to increase the total magnetic flux and thus enhance a far magnetic field as presented in FIG. 3(b). On the other hand, in the anti-phase mode, the magnetic fluxes $\Phi1$ and $\Phi2$ are reversed and cancel out each other to decrease the total magnetic flux as presented in FIG. 3(c).

Figure 4:
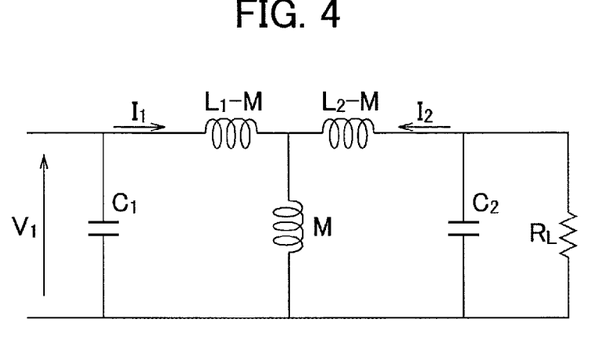
FIG. 4 is a diagram for explaining the in-phase resonance point and the anti-phase resonance point in the wireless power supply system according to the embodiment of the present invention.

FIG. 4 illustrates a T-type equivalent circuit of FIG. 3(a), in which L1 is a self-inductance of the power transmission coil 12, L2 is a self-inductance of the power reception coil 22, M is a mutual inductance, and C1 and C2 are their respective capacitances. The current directions of I1 and I2 are the same as defined in FIG. 3. When the currents flow in the directions illustrated, the circuit enters the in-phase mode in which the far magnetic fluxes strengthen each other.

Figure 5:
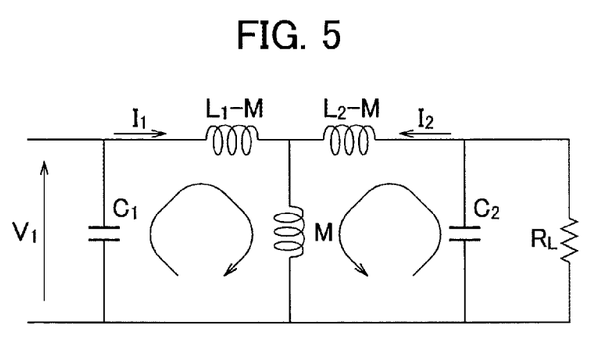
FIG. 5 is a diagram for explaining the in-phase resonance point and the anti-phase resonance point in the wireless power supply system according to the embodiment of the present invention.

In the case where excitation frequencies in the circuit in FIG. 4 are very low, a reactance of C1: $-1/\omega C1$ is dominant in a reactance of a line formed of C1 and L1−M. Meanwhile, a reactance of C2: $-1/\omega C2$ is dominant in a reactance of a line formed of C2 and L2−M. When the frequencies are gradually increased from the above state, the circuit enters a resonance state. In the resonance of this circuit, resonance of the C1, C2, and the mutual inductance M is dominant, and the magnetic fluxes strength each other as illustrated in FIG. 5. This state is the in-phase mode.

Figure 6:
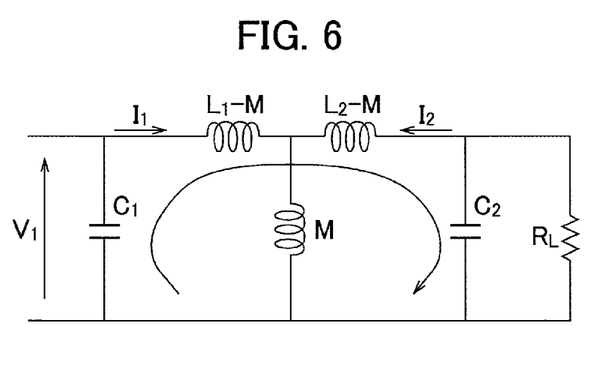
FIG. 6 is a diagram for explaining the in-phase resonance point and the anti-phase resonance point in the wireless power supply system according to the embodiment of the present invention.

On the other hand, in the case where frequencies in the circuit in FIG. 4 are very high, a reactance of L1−M: $\omega(L1-M)$ is dominant in the reactance of the line formed of C1 and L1−M. Meanwhile, a reactance of L2−M: $\omega(L2-M)$ is dominant in the reactance of the line formed of C2 and L2−M. When the frequencies are gradually decreased from the above state, the circuit enters a resonance state in which resonance of a series resonance circuit formed of L1−M, L2−M, C1, and C2 as illustrated in FIG. 6 is dominant. This state is the anti-phase mode.

Here, a wireless power supply system for automobile has a relatively small coupling coefficient. Accordingly, the mutual inductance M is smaller than leak inductances L1−M and L2−M, and L1−M and L2−M are dominant in that state. This is the principle of the occurrence of the in-phase resonance point and the anti-phase resonance point. According to this occurrence principle, the in-phase resonance point is a frequency lower than the anti-phase resonance point.

In sum, the in-phase resonance point is a frequency at which the magnetic flux generated at the power transmission coil 12 and the magnetic flux generated at the power reception coil 22 resonate with each other while strengthening each other. Meanwhile, the anti-phase resonance point is a frequency at which the magnetic flux generated at the power transmission coil 12 and the magnetic flux generated at the power reception coil 22 resonate with each other while cancelling out each other.

Next, description will be provided for the principle based on which the resonance point shifts when a coupling coefficient changes. In the case where the coupling coefficient increases, the mutual inductance M increases. Here, a resonance frequency f of LC series resonance is represented by $1/(2\pi\sqrt{LC})$, in general. Thus, the resonance frequency decreases, as L or C increases. According to this principle, the resonance point in the in-phase mode shifts to a low frequency side when the mutual inductance M increases.

Meanwhile, in the anti-phase mode, the series resonance circuit formed of L1−M, L2−M, C1, and C2 is dominant. Thus, the inductances L1−M and L2−M decrease, as the mutual inductance M increases. For this reason, in the anti-phase mode, the resonance point shifts to a high frequency side. This is the principle of the shift of the frequency of the resonance point along with an increase in the coupling coefficient. According to this principle, as illustrated in FIG. 2, the in-phase resonance points are generated on a low frequency side and the anti-phase resonance points are generated on a high frequency side. In addition, as the coupling coefficient increases, a difference between the frequencies of the in-phase resonance point and the anti-phase resonance point increases.

In the meantime, as the current amplitude at the resonance point increases, the received power voltage of the power reception coil 22 similarly increases. Accordingly, the resonance points of the coils are analogous, as they are, to the voltage characteristics of the power reception coil 22. Then, in the case where a circuit, such as an external filter circuit, having a resonance frequency is connected besides the resonance frequency of the wireless power supply coils, the resonance frequency of the external filter circuit does not change even if the coupling coefficient changes. For this reason, the disclosure herein is directed to a system in which the resonance frequency changes in use for wireless charging of automobiles with a coupling coefficient varied.

Next, description will be provided for the reason that the excitation frequency of the judging power is set lower than the in-phase resonance point or higher than the anti-phase resonance point in order to increase the received power voltage of the power reception coil 22 monotonously as the distance between the power transmission coil 12 and the power reception coil 22 becomes shorter.

Figure 7:
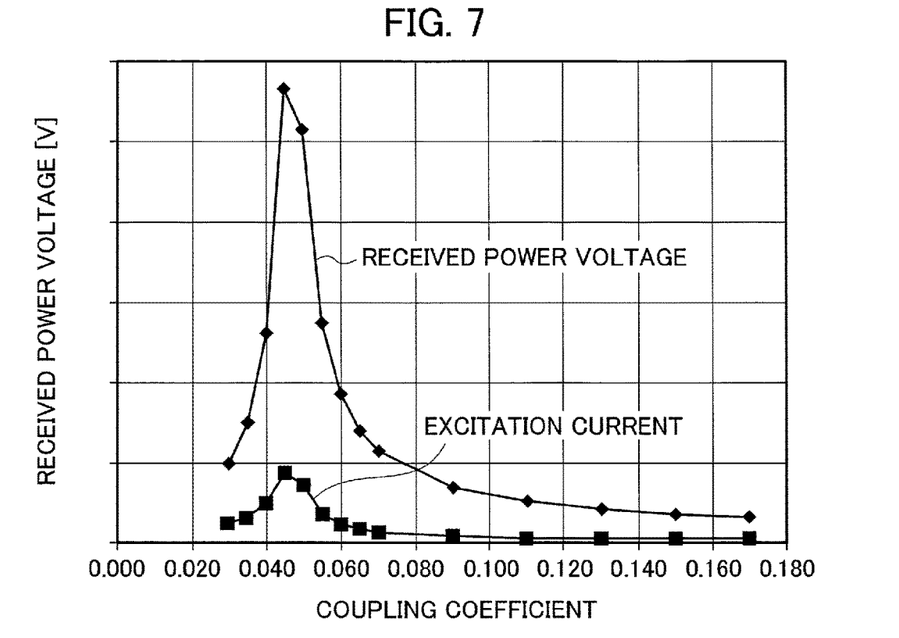
FIG. 7 is a diagram presenting a relationship between a received power voltage of the power reception coil and a coupling coefficient in the wireless power supply system according to the embodiment of the present invention.

If the excitation frequency of the judging power is set to 85 kHz in the frequency characteristics of the received power voltage of the power reception coil 22 illustrated in FIG. 2, a relationship between the received power voltage of the power reception coil 22 and the coupling coefficient is one illustrated in FIG. 7. In FIG. 7, the received power voltage of the power reception coil 22 sharply increases along with an increase of the coupling coefficient K from 0.03 to 0.05, and reaches its peak around the coupling coefficient K=0.05, and then greatly decreases. In other words, it is demonstrated that the received power voltage of the power reception coil 22 does not increase monotonously even when the coupling coefficient increases (the distance between the power transmission coil 12 and the power reception coil 22 becomes shorter). In addition, the excitation current of the ground coil 12 changes in the same manner. For this reason, the above case has a problem that a complicated logic is required to judge whether the power reception coil 22 and the power transmission coil 12 come close to each other.

Figure 8:
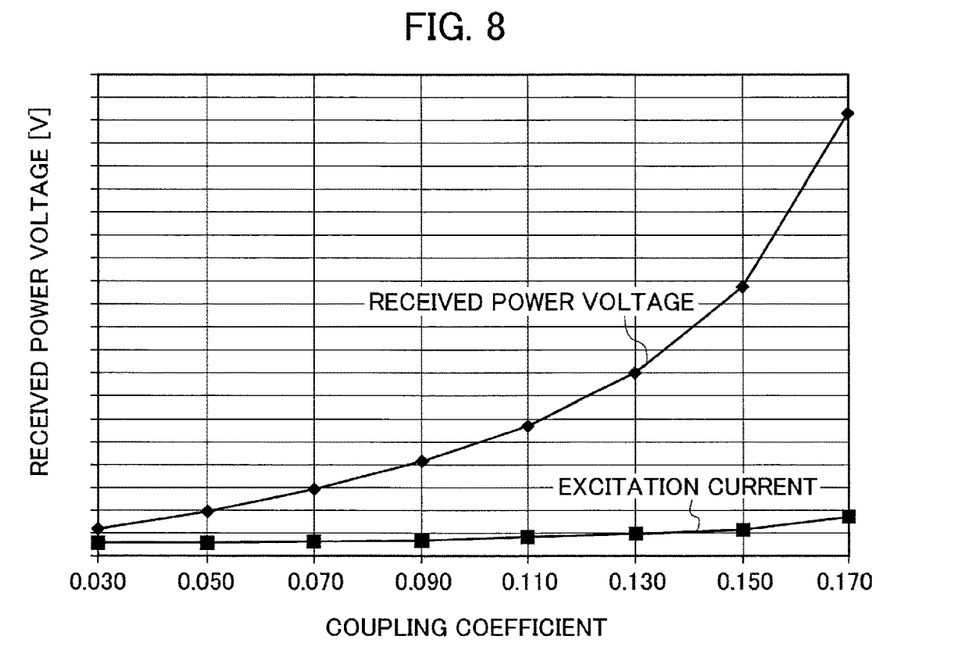
FIG. 8 is a diagram presenting a relationship between a received power voltage of the power reception coil and a coupling coefficient in the wireless power supply system according to the embodiment of the present invention.

In contrast to this, if the excitation frequency of the judging power is set to 80 kHz, which is a frequency lower than the in-phase resonance point group, a relationship between the received power voltage of the power reception coil 22 and the coupling coefficient is one illustrated in FIG. 8. In FIG. 8, the received power voltage of the power reception coil 22 monotonously increases along with an increase of the coupling coefficient (the distance between the power transmission coil 12 and the power reception coil 22 becomes shorter). In this case, the excitation current of the ground coil 12 changes in the same manner. The same characteristics also appear in the case where the excitation frequency of the judging power is set to a frequency higher than the anti-phase resonance point group.

Thus, the excitation frequency of the judging power needs to be set lower than the in-phase resonance point or higher than the anti-phase resonance point in order to increase the received power voltage of the power reception coil 22 monotonously as the distance between the power transmission coil 12 and the power reception coil 22 becomes shorter. In a specific setting method, the excitation frequency may be set lower than the in-phase resonance point of the curved line having the largest coupling coefficient or higher than the anti-phase resonance point of the curved line having the largest coupling coefficient. In FIG. 2, for example, the excitation frequency may be set lower than the in-phase resonance point of the curved line of K=0.17 that is the largest coupling coefficient or higher than the anti-phase resonance point of the curved line of K=0.17, or more specifically may be set lower than 81.2 kHz or higher than 95.6 kHz.

[Transimpedance]

Figure 9:
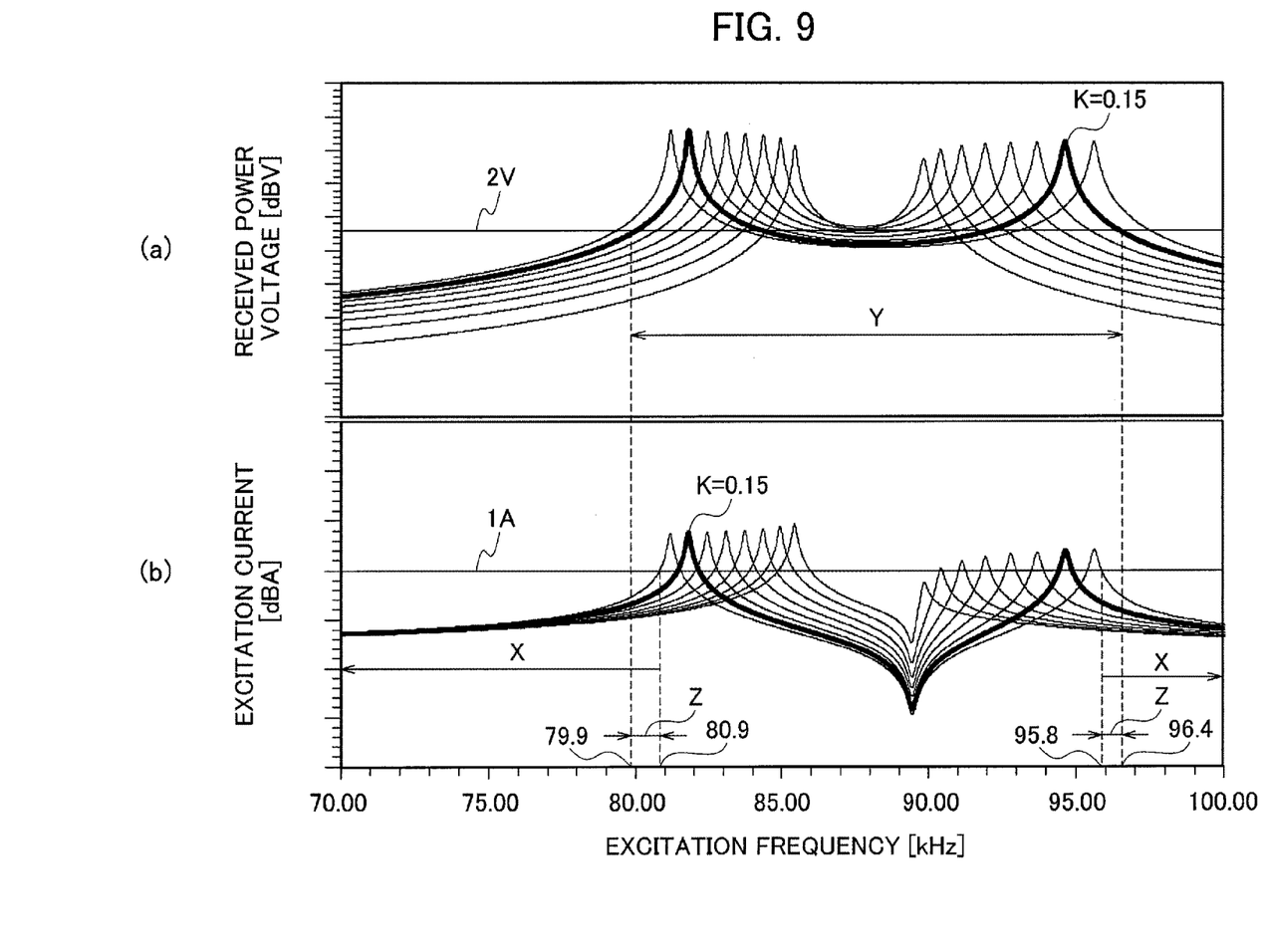
FIG. 9 is a diagram presenting frequency characteristics of an excitation current of the power transmission coil and frequency characteristics of the received power voltage of the power reception coil in the wireless power supply system according to the embodiment of the present invention in a comparative manner.

In the wireless power supply system 1 according to the present embodiment, a leakage magnetic field from the power transmission coil 12 needs to be kept small during transmission of the judging power. To this end, a surface leakage magnetic flux density of the power transmission coil 12 needs to be within a range not exceeding a standard value set for the power transmission coil 12, and accordingly the excitation current of the power transmission coil 12 needs to be set lower than 1 A, for example. As presented by the frequency characteristics of the excitation current in FIG. 9(b), the excitation frequency of the judging power needs to be set within regions X where the excitation currents of all the coupling coefficients are lower than 1 A. In FIG. 9(b), the excitation frequency is set within a range lower than 80.9 kHz or higher than 95.8 kHz.

Meanwhile, the received power voltage of the power reception coil 22 needs to be set within a range higher than at least a minimum resolution of a voltage detector (not illustrated) that detects the received power voltage of the power reception coil 22. For this reason, if the minimum resolution is 2 V, the excitation frequency of the judging power needs to be set within a region Y where the received power voltage of the curved line of K=0.15, with which the parking position judgment is assumed to be possible, is higher than 2 V as presented in the frequency characteristics of the received power voltage in FIG. 9(a). In FIG. 9(a), the excitation frequency is set within a range higher than 79.9 kHz and lower than 96.4 kHz. Thus, the ranges of the excitation frequency satisfying both the requirements are regions Z. In FIG. 9, the regions Z are a range higher than 79.9 kHz and lower than 80.9 kHz and a range higher than 95.8 kHz and lower than 96.4 kHz.

However, this method of setting the excitation frequency of the judging power with the requirements of the excitation current and the received power voltage individually taking into account entails the very severe requirements. To avoid this, the present embodiment introduces an indicator named a transimpedance so that the excitation frequency can be easily selected.

The transimpedance represents a ratio of the received power voltage of the power reception coil 22 to the excitation current of the power transmission coil 12, and is expressed by the following formula.

Transimpedance=Received Power Voltage of Power Reception Coil 22/Excitation Current of Power Transmission Coil 12.

Figure 10:
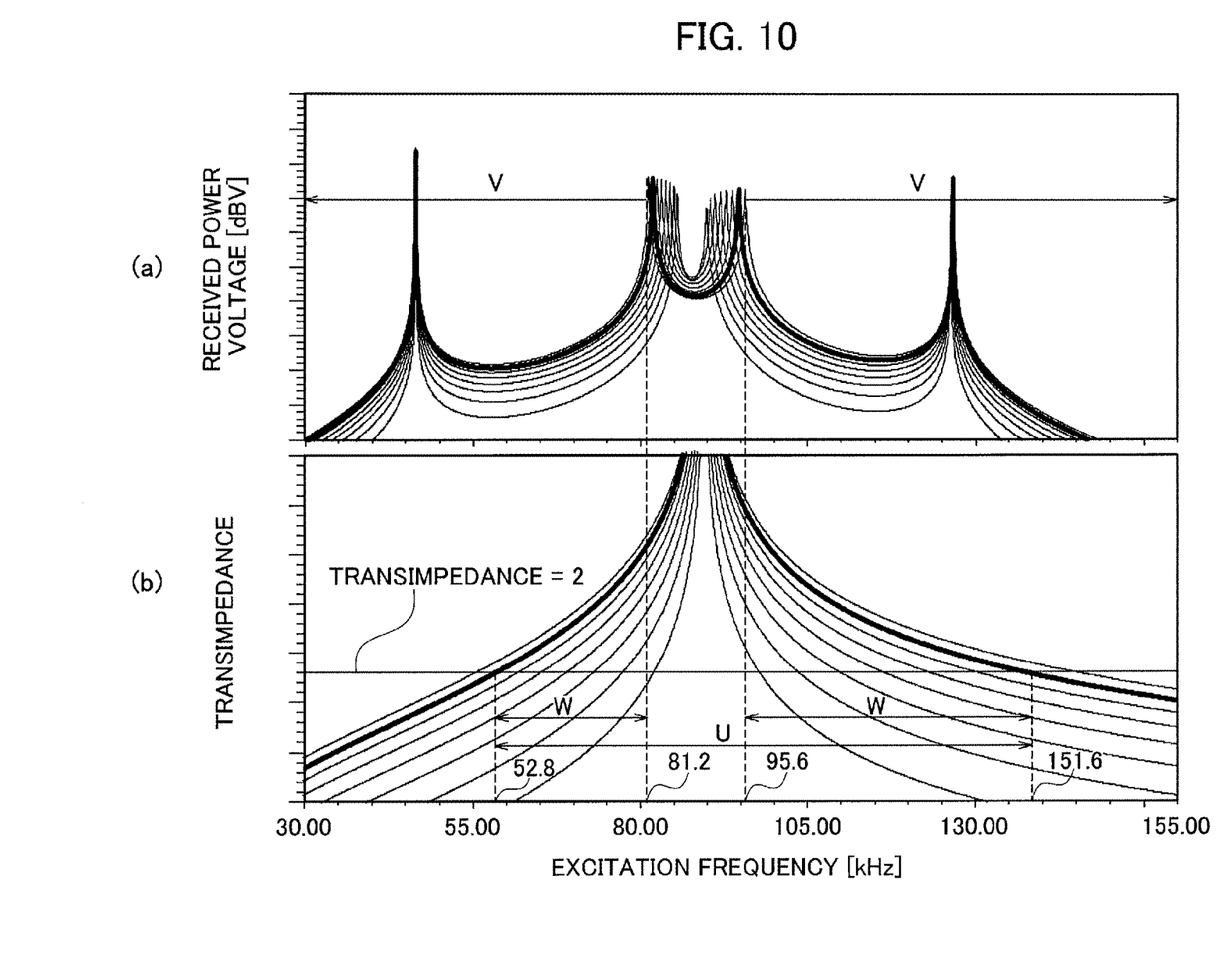
FIG. 10 is a diagram presenting the frequency characteristics of the received power voltage of the power reception coil and frequency characteristics of a transimpedance in the wireless power supply system according to the embodiment of the present invention in a comparative manner.

In the case where it is desired to set the received power voltage of the power reception coil 22 to a voltage higher than 2 V and the excitation current of the power transmission coil 12 to a current lower than 1 A, for example, the excitation frequency of the judging power may be just set within a region where the transimpedance is higher than 2. The setting of the transimpedance as defined above makes it possible to figure out a region where the received power voltage of the power reception coil 22 is high while the excitation current of the power transmission coil 12 is low. Description thereof will be specifically provided with reference to frequency characteristics of the transimpedance in FIG. 10(b). The transimpedances are represented by multiple curved lines depending on the coupling coefficients as presented in FIG. 10(b), and are represented by 8 curved lines of K=0.03 to 0.17 in FIG. 10(b). Among them, the curved line of the coupling coefficient K=0.15 serves as a threshold for judging that the parking position is allowable in the parking position judgment. Thus, the excitation frequency of the judging power may be set within a region U where the transimpedance of the curved line of the coupling coefficient K=0.15 is higher than 2. The region U is a range higher than 52.8 kHz and lower than 151.6 kHz in FIG. 10(b).

Moreover, the excitation frequency of the judging power needs to be set lower than the in-phase resonance point and higher than the anti-phase resonance point as explained using FIG. 2, and for this reason is set within either of regions V as presented in FIG. 10(a). The regions V are a range lower than 81.2 kHz and a range higher than 95.6 kHz.

Hence, when the excitation frequency of the judging power is set within a frequency range of a region W satisfying both the region U and either of the regions V, the excitation frequency can be set such that the received power voltage of the power reception coil 22 monotonously increases while the transimpedance satisfies the requirement. In other words, the excitation frequency can be set such that the leakage magnetic field can be kept small while the received power voltage can be made high. Such regions W are a range higher than 52.8 kHz and lower than 81.2 kHz and a range higher than 95.6 kHz and lower than 151.6 kHz. Moreover, as explained using FIG. 9, when the excitation frequency of the judging power is set with the requirements of both the excitation current and the received power voltage taken into account, the excitation frequency of the judging power can be set within the region Z where both the requirements are satisfied more strictly. In this way, if the transimpedance is set as explained above and the excitation frequency of the judging power is set to a frequency at which the transimpedance is equal to or higher than a predetermined value, the excitation frequency can be set such that the leakage magnetic field can be kept small while the received power voltage can be made higher than the minimum resolution of the voltage detector.

[Procedure of Parking Position Judgment Processing]

Figure 11:
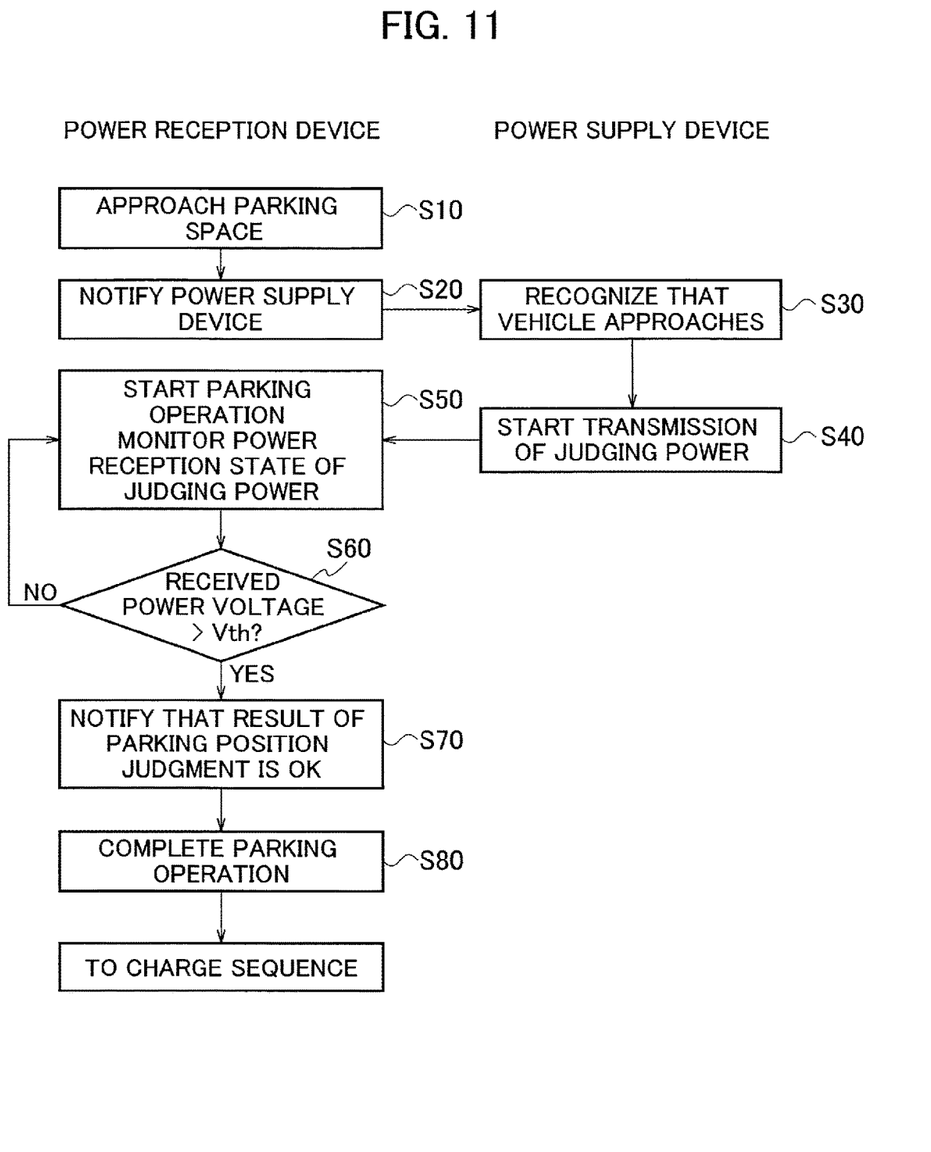
FIG. 11 is a flowchart presenting a processing procedure of parking position judgment processing by the wireless power supply system according to the embodiment of the present invention.

Next, with reference to a flowchart in FIG. 11, description will be provided for a procedure of the parking position judgment processing by the wireless power supply system 1 according to the present embodiment.

As presented in FIG. 11, first, when the vehicle 10 approaches the parking space 2 in step S10, the charge controller 24 of the power reception device 200 sends a notification that the vehicle 10 approaches the parking space 2 to the power supply device 100 on the ground side through the wireless communication unit 23 in step S20.

In step S30, the control unit 14 of the power supply device 100 receives the notification from the power reception device 200 through the wireless communication unit 13 and recognizes that the vehicle 10 approaches.

In step S40, the control unit 14 starts transmission of the judging power from the power transmission coil 12 by controlling the inverter 113, and sends a notification of the transmission start of the judging power to the power reception device 200 through the wireless communication unit 13.

In step S50, the charge controller 24 receives the notification from the power supply device 100 through the wireless communication unit 23, allows the vehicle 10 to start an operation of parking in the parking space 2, and monitors the power reception state of the judging power at the power reception coil 22.

Then, when a driver or automatic driving starts the operation of parking the vehicle 10, the voltage determination unit 241 of the charge controller 24 judges whether the received power voltage of the power reception coil 22 is higher than a predetermined threshold Vth in step S60. Then, if the received power voltage of the power reception coil 22 is equal to or lower than the threshold Vth, the charge controller 24 moves back to step S50 and continues monitoring the power reception state of the judging power. On the other than, if the received power voltage of the power reception coil 22 is higher than the threshold Vth, the charge controller 24 moves forward to step S70.

In step S70, the charge controller 24 judges that the power reception coil 22 and the power transmission coil 12 come sufficiently close to each other and the parking position is adequate, and notifies the driver that a result of the parking position judgment is OK by means of the notifier 30.

In step S80, the driver stops the vehicle 10 and completes the parking operation, the parking position judgment processing is terminated. After that, the charge controller 24 shifts to a charge sequence.

In the aforementioned parking position judgment processing in FIG. 11, the judging power is transmitted during the operation of parking the vehicle 10. However, the judging power may be transmitted after the vehicle 10 stops, alternatively. Hereinafter, with reference to FIG. 12, description will be provided for a procedure of parking position judgment processing for a case where the judging power is transmitted after the vehicle 10 stops.

Figure 12:
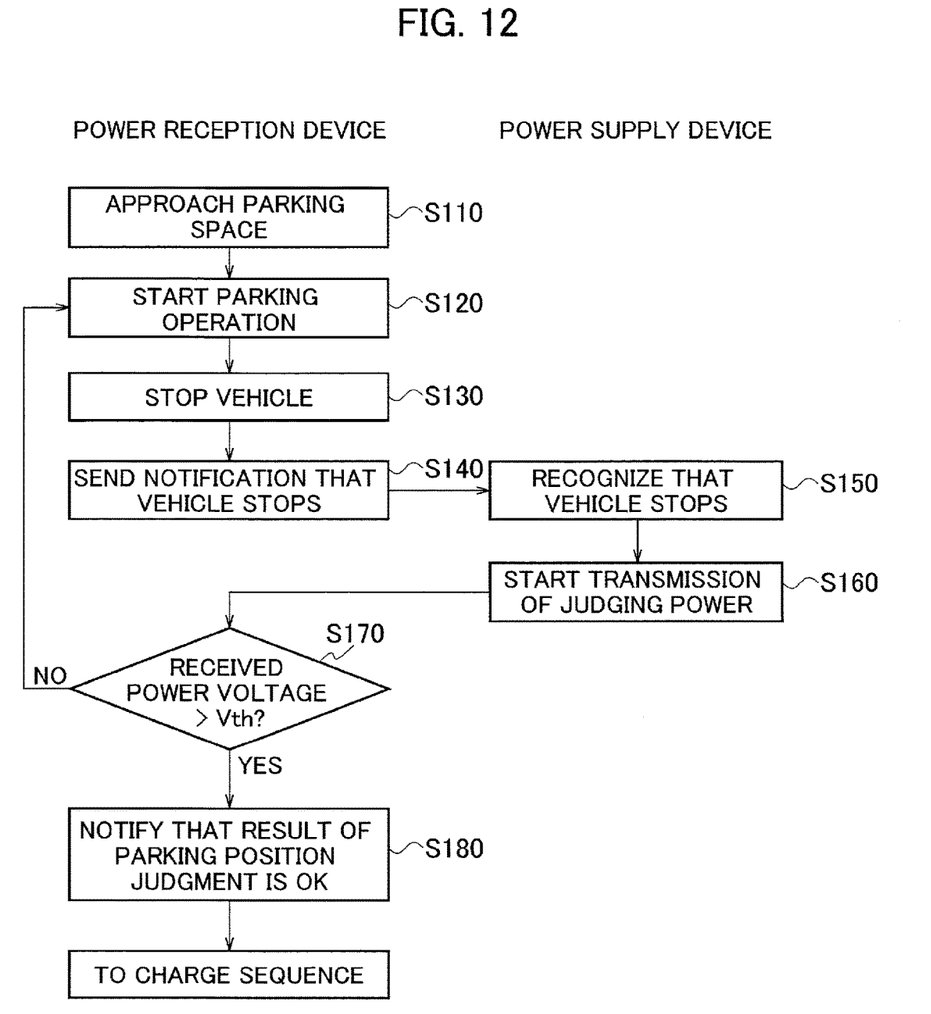
FIG. 12 is a flowchart presenting a processing procedure of parking position judgment processing by the wireless power supply system according to the embodiment of the present invention.

As illustrated in FIG. 12, first, when the vehicle 10 approaches the parking space 2 in step S110, a driver or automatic driving starts an operation of parking the vehicle 10 in the parking space 2 in step S120.

Then, when the vehicle 10 is stopped in step S130, the charge controller 24 of the power reception device 200 sends a notification of the stoppage of the vehicle 10 to the power supply device 100 on the ground side through the wireless communication unit 23 in step S140.

In step S150, the control unit 14 of the power supply device 100 receives the notification from the power reception device 200 through the wireless communication unit 13, and recognizes that the vehicle 10 stops.

In step S160, the control unit 14 starts transmission of the judging power from the power transmission coil 12 by controlling the inverter 113, and then sends a notification of the transmission start of the judging power to the power reception device 200 through the wireless communication unit 13.

In step S170, the charge controller 24 receives the notification form the power supply device 100 through the wireless communication unit 23, and monitors the power reception state of the judging power at the power reception coil 22. In this step, the voltage determination unit 241 judges whether the received power voltage of the power reception coil 22 is higher than the predetermined threshold Vth. Then, if the received power voltage of the power reception coil 22 is equal to or lower than the threshold Vth, the charge controller 24 moves back to step S120, and instructs the driver to start over the operation of parking the vehicle 10 again by means of the notifier 30. On the other than, if the received power voltage of the power reception coil 22 is higher than the threshold Vth, the charge controller 24 moves forward to step S180.

In step S180, the charge controller 24 judges that the power reception coil 22 and the power transmission coil 12 come sufficiently close to each other and the parking position is adequate, and notifies the driver that a result of the parking position judgment is OK by means of the notifier 30. Thus, the parking operation of the vehicle 10 is completed, and the parking position judgment processing is terminated. After that, the charge controller 24 shifts to the charge sequence.

Effects of Embodiment

As described above in details, the wireless power supply system 1 according to the present embodiment transmits the judging power for judging the parking position from the power transmission coil 12 to the power reception coil 22, while the excitation frequency of this judging power is set lower than the in-phase resonance point or higher than the anti-phase resonance point. This causes the received power voltage of the power reception coil 22 to increase monotonously as the distance between the power transmission coil 12 and the power reception coil 22 becomes shorter, and therefore makes it possible to judge the position of a vehicle at low cost without needing an additional device or execution of complicated control.

Moreover, in the wireless power supply system 1 according to the present embodiment, the in-phase resonance point is defined as a frequency at which the magnetic flux generated at the power transmission coil 12 and the magnetic flux generated at the power reception coil 22 resonate with each other while strengthening each other. Meanwhile, the anti-phase resonance point is defined as a frequency at which the magnetic flux generated at the power transmission coil 12 and the magnetic flux generated at the power reception coil 22 resonate with each other while cancelling out each other. Thus, the frequencies at each of which the received power voltage of the power reception coil 22 has a peak can be figured out, and the range of the necessary excitation frequency can be set.

Further, in the wireless power supply system 1 according to the present embodiment, the ratio of the received power voltage of the power reception coil 22 to the excitation current of the power transmission coil 12 is set as the transimpedance, and the excitation frequency of the judging power is set to a frequency at which the transimpedance is equal to or higher than the predetermined value. In this way, the excitation frequency can be set such that the leakage magnetic field of the power transmission coil 12 can be kept small by setting a small excitation current of the power transmission coil 12, while the received power voltage of the power reception coil 22 can be made higher than the minimum resolution of the voltage detector.

In addition, in the wireless power supply system 1 according to the present embodiment, the received power voltage of the power reception coil 22 is set within a range higher than the minimum resolution of the voltage detector. This allows the voltage detector to surely measure the received power voltage of the power reception coil 22, and thereby enables stable parking position judgment.

Furthermore, in the wireless power supply system 1 according to the present embodiment, the excitation current of the power transmission coil 12 is set within a range in which the surface leakage magnetic flux density of the power transmission coil 12 is equal to or lower than the standard value. This eliminates the necessity to additionally provide a shield to the power transmission coil 12, and thus enables cost reduction.

It should be noted that the foregoing embodiment is just one example of the present invention. Hence, the present invention should not be limited to the above embodiment, but as a matter of course may be altered in various modes other than the foregoing embodiment, depending on factors such as design without departing from the technical spirit of the present invention.

REFERENCE SIGNS LIST 1 wireless power supply system
2 parking space
10 vehicle
11 power control unit
12 power transmission coil
13 wireless communication unit
14 control unit
22 power reception coil
23 wireless communication unit
24 charge controller
25 rectifier
26 relay
27 battery
28 inverter
29 motor
30 notifier
100 power supply device
110 AC power supply
111 rectifier
112 PFC circuit
113 inverter
141 inverter controller
142 PFC controller
143 sequence controller
200 power reception device
241 voltage determination unit

The invention claimed is:

1. A wireless power supply system that performs wireless power supply between a power transmission system installed at a parking space and a power reception system mounted on a vehicle, the wireless power supply system comprising:
   a power transmission coil; and
   a controller configured to:
      set an excitation frequency of judging power to a first frequency lower than a predetermined in-phase resonance point or higher than a predetermined anti-phase resonance point, wherein at the first frequency, a transimpedance representing a ratio of a received power voltage of a power reception coil to an excitation current of the power transmission coil is equal to or higher than a predetermined value; and
      generate an excitation voltage command to cause the power transmission coil to transmit the judging power whose excitation frequency is set to the first frequency for judging a parking position from the power transmission coil to the power reception coil in an operation of parking the vehicle in the parking space,
   wherein the predetermined in-phase resonance point is a frequency at which a magnetic flux generated at the power transmission coil and a magnetic flux generated at a power reception coil resonate with each other while strengthening each other, and the predetermined anti-phase resonance point is a frequency at which a magnetic flux generated at the power transmission coil and a magnetic flux generated at the power reception coil resonate with each other while cancelling out each other.

2. The wireless power supply system according to claim 1, wherein the received power voltage of the power reception coil is set within a range higher than a minimum resolution of a voltage detector that detects the received power voltage of the power reception coil.

3. The wireless power supply system according to claim 1, wherein the excitation current of the power transmission coil is set within a range in which a surface leakage magnetic flux density of the power transmission coil is equal to or lower than a standard value set for the power transmission coil.

* * * * *